United States Patent
Litral (10) Patent No.: US 9,127,459 B2
(45) Date of Patent: Sep. 8, 2015

(54) SURFACE COVERING TILES HAVING AN EDGE TREATMENT FOR ASSEMBLY THAT ALLOWS FOR GROUTING

(75) Inventor: Tim Litral, Florence, AL (US)

(73) Assignee: Tarkett Inc., Farnham, Quebec (CA)

( * ) Notice: Subject to any disclaimer, the term of this patent is extended or adjusted under 35 U.S.C. 154(b) by 0 days.

(21) Appl. No.: 13/636,229

(22) PCT Filed: Dec. 16, 2010

(86) PCT No.: PCT/US2010/060689
§ 371 (c)(1),
(2), (4) Date: Sep. 20, 2012

(87) PCT Pub. No.: WO2011/087704
PCT Pub. Date: Jul. 21, 2011

(65) Prior Publication Data
US 2013/0111843 A1   May 9, 2013

Related U.S. Application Data

(60) Provisional application No. 61/288,989, filed on Dec. 22, 2009.

(51) Int. Cl.
| | |
|---|---|
| *E04C 2/30* | (2006.01) |
| *B44C 5/04* | (2006.01) |
| *E04F 15/10* | (2006.01) |
| *B29C 47/00* | (2006.01) |
| *B29C 65/48* | (2006.01) |

(52) U.S. Cl.
CPC . *E04C 2/30* (2013.01); *B29C 47/00* (2013.01); *B29C 47/0021* (2013.01); *B29C 65/48* (2013.01); *B44C 5/04* (2013.01); *E04F 15/10* (2013.01); *E04F 2201/0138* (2013.01)

(58) Field of Classification Search
CPC ............. E04F 15/02038; E04F 2201/0153; E04F 2201/0115; E04F 13/0894; E04F 13/076; E04F 13/0889; E04F 2201/023; E04F 2201/041
USPC ............ 52/588.1, 589.1, 590.1, 590.2, 591.4, 52/592.1, 177
See application file for complete search history.

(56) References Cited

U.S. PATENT DOCUMENTS

| | | | |
|---|---|---|---|
| 4,436,779 A | 3/1984 | Menconi et al. | |
| 5,630,304 A * | 5/1997 | Austin | 52/384 |
| 5,791,114 A | 8/1998 | Mandel | |
| 6,363,677 B1 * | 4/2002 | Chen et al. | 52/586.1 |
| 6,880,307 B2 * | 4/2005 | Schwitte et al. | 52/592.1 |
| 7,086,205 B2 * | 8/2006 | Pervan | 52/403.1 |

(Continued)

OTHER PUBLICATIONS

International Search Report dated Mar. 15, 2011 from US International Searching Authority.

*Primary Examiner* — Brian Glessner
*Assistant Examiner* — Adam Barlow
(74) *Attorney, Agent, or Firm* — Norris McLaughlin & Marcus PA (57) ABSTRACT

Surface covering tiles made using synthetic materials employ junction strips which enable the tiles to be connected to one another. The connections can be made with or without adhesive. When the tiles are connected, a space is left between adjacent decorative surfaces to permit the application of grout or simulated grout therein. When the tiles are used as floor covering they can be used to make floating floors. As wall coverings, the tiles are adhered to the walls using conventional means.

7 Claims, 6 Drawing Sheets

(56) References Cited

U.S. PATENT DOCUMENTS

| | | | |
|---|---|---|---|
| 7,188,456 B2* | 3/2007 | Knauseder | 52/592.1 |
| 7,288,310 B2* | 10/2007 | Hardwick | 428/181 |
| 7,550,192 B2 | 6/2009 | Dempsey et al. | |
| 7,610,731 B1 | 11/2009 | Collison | |
| 8,071,193 B2* | 12/2011 | Windmoller | 428/60 |
| 2003/0131549 A1 | 7/2003 | Kappeli et al. | |
| 2008/0263987 A1* | 10/2008 | Leopolder et al. | 52/588.1 |
| 2009/0126308 A1* | 5/2009 | Hannig et al. | 52/588.1 |
| 2010/0281810 A1* | 11/2010 | Ruland | 52/588.1 |
| 2012/0240502 A1* | 9/2012 | Wilson et al. | 52/416 |

* cited by examiner

SURFACE COVERING TILES HAVING AN EDGE TREATMENT FOR ASSEMBLY THAT ALLOWS FOR GROUTING

BACKGROUND OF THE INVENTION

1. Field of the Invention

The invention has to do with surface covering tiles that can be connected to one another by means of an edge treatment that allows for grouting after the tiles are assembled. In a preferred embodiment, the invention relates to a flooring tile that can be assembled and grouted without adhesion to a sub-floor. The invention also concerns a process of manufacturing the tile product and a method of installing the product.

2. The Related Art

Various constructions for floating floor coverings and for connecting surface covering tiles to one another have been described in the art.

In Published Patent Application No. US2003/0131549, for example, a tile having a wearing layer and a support layer is described wherein the support layer has projections and mating cutouts. The projections and cutouts are hidden by the wearing layer when the tiles are installed. The installed tiles have narrow joints between individual tiles to allow welding so that dirt cannot adversely affect the flooring.

U.S. Pat. No. 5,791,114 discloses tiles having projections and mating cutouts that are virtually identical to those disclosed in the published application discussed above. A beveled edge is provided on the underside of the projections to facilitate installation. Unlike the published application discussed above, the projections and mating cutouts are not hidden when the tiles are installed.

In U.S. Pat. No. 7,610,731, a snap-together floor structure is described which requires a tray, a flooring material, a rubber grommet and a rubber matrix. The invention provides a floating floor structure that can be assembled without the use of adhesives on the subfloor.

A modular surface for use as a sports deck is described in U.S. Pat. No. 4,436,779. Modules for a non-anchored modular surface are described which employ an expansion joint geometry adapted to retain the square shape of each module. This permits a surface including a large number of interlocked modules to remain flat and unbuckled with changing temperature conditions.

Resilient floor tiles having a convex edge are described in U.S. Pat. No. 7,550,192. The objective of the design is to simulate ceramic and natural tile floors. The tiles are installed conventionally by adhering them to a sub-floor. Installed tiles can be spaced from one another to permit installations using grout.

SUMMARY OF THE INVENTION

The tiles of the invention, when assembled by connecting them to one another, do not require adhesion to the underlying surface. In the case of flooring, the assembled tiles are used to make a floating floor. When the tiles are used to cover walls, they can be adhered to the underlying surface using conventional adhesives.

Each tile is constructed with integral junction strips which allow adjacent tiles to be connected to and interlocked with one another. The junction strips are sized so that the upper decorative surfaces of adjacent tiles are evenly spaced from one another to permit the application of grout or the incorporation of simulated grout in the spaces between the decorative surfaces.

Conventional materials used in the manufacture of tiles containing plastics, such as resilient tiles, are used to make and decorate the tiles of the invention. Adhesives can optionally be applied to the junction strips either during manufacture or in the field to securely affix the tiles to one another. Grout material applied in the field can also serve as the adhesive or as a supplemental adhesive.

All percentages set forth herein are by weight/weight unless otherwise designated.

BRIEF DESCRIPTION OF THE DRAWINGS

The drawings are not intended to be to scale.

DETAILED DESCRIPTION OF THE INVENTION

Figure 1:
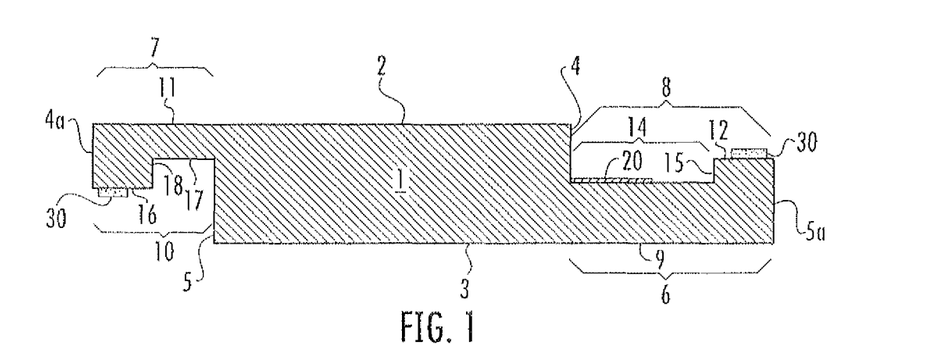
FIG. 1 is a section view of a tile of the invention.
Figure 2:
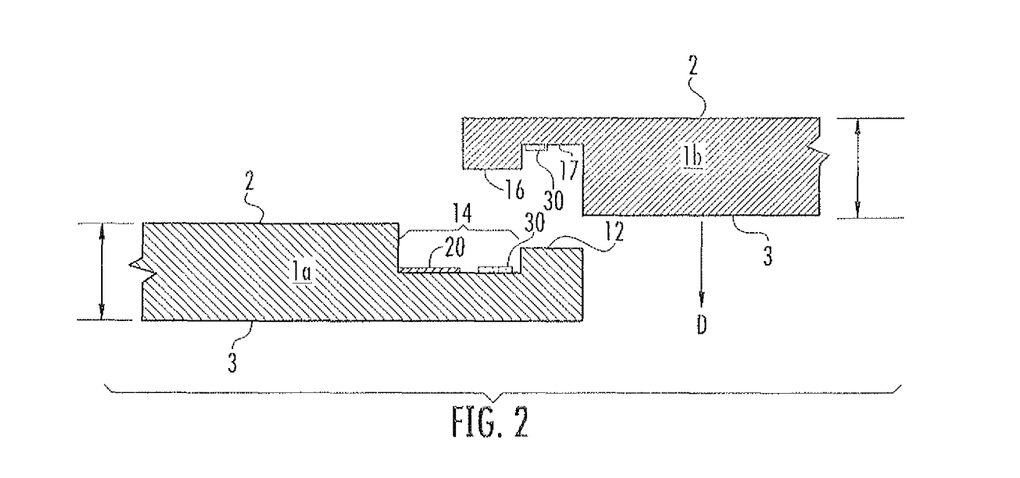
FIG. 2 is a partial section view of two tiles of the invention.

A tile 1 (or tile substrate as described with reference to FIG. 4) is illustrated in section in FIG. 1. The tile has an upper tile surface 2 and an opposing lower tile surface 3. FIG. 2 illustrates, in section, portions of two tiles, designated as 1a and 1b, each having a thickness t, and the tiles are positioned so that they can be assembled by moving tile 1b downwardly in the direction D.

Referring to FIG. 1, the upper tile surface 2 has side edges 4 and 4a. Extending from the right-hand side edge 4 is a lower junction strip 6. The lower junction strip 6 has an upper face 8 and an opposing lower junction strip surface 9. The lower junction strip surface 9 being a portion of and included within the lower tile surface 3. The upper face 8 is comprised of a first raised portion 12 and a first channel 14. The first channel 14 has a first width defined by side edge 4 and first inner edge 15 of first raised portion 12. The side edge 4 and first inner edge is 15 are in parallel. The first raised portion 12 has a second width defined by first inner edge 15 and lower junction strip outer edge 5a. Lower junction strip outer edge 5a is the same as the right-hand lower side edge of the tile. Element 20 within first channel 14 is optional. It can be an optional decorative portion which simulates grout or it can be an optional grout base which enhances the adherence of grout that is applied after the tiles are installed.

Further referring to FIG. 1, the lower tile surface 3 has side edges 5 and 5a. Extending from the left-hand side edge 5 is an upper junction strip 7. The upper junction strip 7 has a lower face 10 and an opposing upper junction strip surface 11. The upper junction strip surface 11 being a portion of and included within the upper tile surface 2. The lower face 10 is comprised of a second raised portion 16 and a second channel 17. The second channel 17 has a third width defined by side edge 5 and second inner edge 18 of second raised portion 16. The side edge 5 and second inner edge 18 are in parallel. The second raised portion 16 has a fourth width defined by second inner edge 18 and upper junction strip outer edge 4a. Upper junction strip outer edge 4a is the same as the left-hand upper side edge of the tile.

Figure 3:
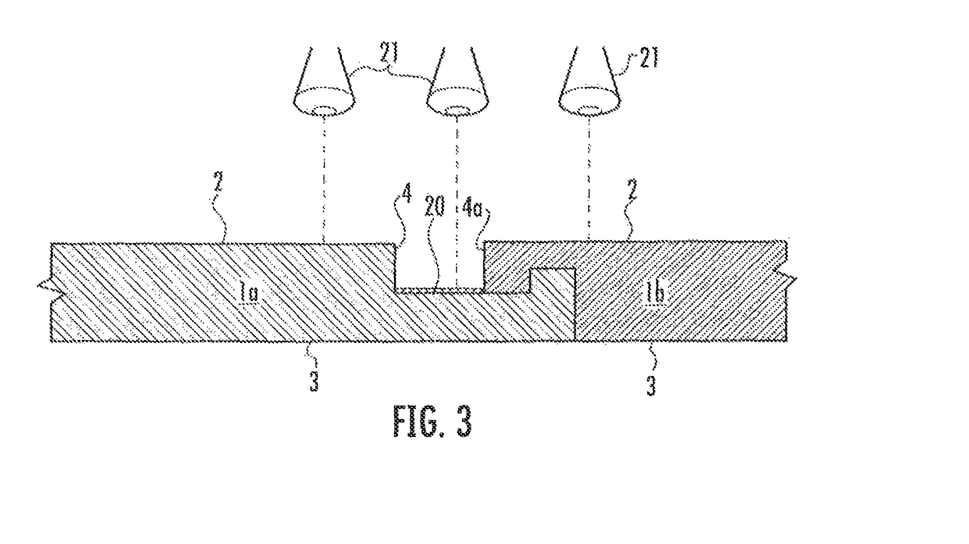
FIG. 3 is a partial section view of two tiles of the invention which have been assembled.

FIG. 3 illustrates the tiles of FIG. 2 after they have been assembled. Both of the upper tile surfaces 2 are in the same upper tile surface plane. And both of the lower tile surfaces 3 are in the same lower tile surface plane. The upper and lower tiles surface planes are parallel planes. When the tiles are assembled, element 20 is uncovered and visible from eyes 21 looking down upon the upper tile surfaces 2.

Referring to FIGS. 1-3, the first raised portion 12 of the lower junction strip 6 has a thickness less than the thickness t of the tile and is sized to fit within and interlock with the second channel 17 of the upper junction strip 7. The second raised portion 16 of the upper junction strip 7 also has a thickness less than the thickness of the tile and the fourth width of the second raised portion 16 is less than the first width of the first channel 14 of lower junction strip 6. Thus, when the tiles are assembled as illustrated in FIG. 3 there is a space between side edges 4 and 4a. And this space permits the optional addition therein of decorative elements such as grout or elements having the appearance of grout.

Typical dimensions of the tile of FIGS. 1-3 would include an overall thickness t of 180 mils. Edges 4 and 4a each have a thickness of 100 mils, edges 5 and 5a each have a thickness of 125 mils and edges 15 and 18 each have a thickness of 47 mils. The widths of first raised portion 12 and second channel 17 are the same at 245 mils. And the widths of lower raised portion 16 and the space between element 20 and edge 15 are the same at 240 mils. The total width of first channel 14 is 490 mils.

Adhesives 30 can optionally be used to attach the tiles to one another. The adhesives 30 can be applied to the first and/or second raised portions and/or the first and/or second channels. If adhesive 30 is applied to the first channel, it preferably should not be applied to the portion of the channel that is visible when the tiles are installed. The adhesives 30 can be applied when the tiles are manufactured or in the field. It is preferable to apply the adhesive 30 to second channel 17 because the adhesive 30 then is hidden when the tiles are installed. And if adhesive 30 is applied to second channel 17 during manufacture, there is no need to apply release paper which then would need to be removed in the field. If adhesive 30 is applied during manufacture to a raised portion, such as first raised portion 12, then release paper also must be applied over the adhesive 30. Various types of adhesives can be used, for example, hot melt adhesives or water borne acrylic that has been dried to a tacky state. Other suitable adhesives can be used as will be apparent to those having skill in the art. As noted above, grout material applied in the field can also service as the adhesive or as a supplemental adhesive to those described above.

Figure 4:
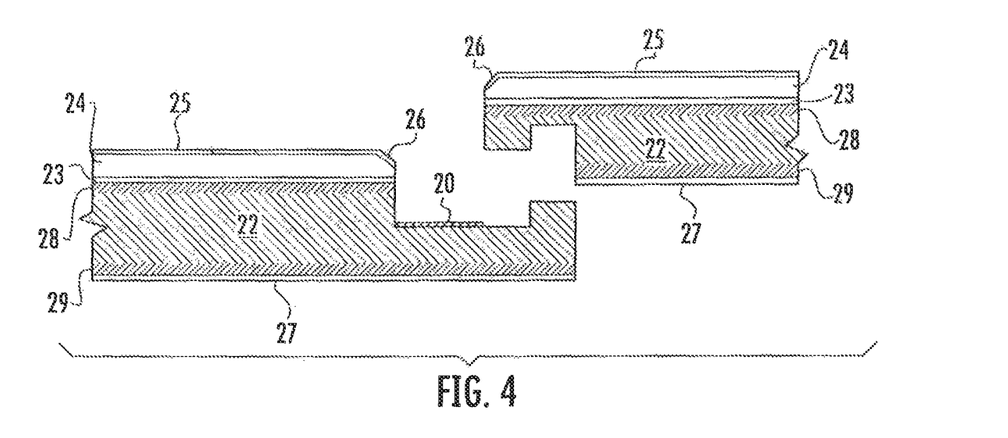
FIG. 4 is a partial section view of a preferred embodiment of two tiles of the invention.

A preferred embodiment of the tile is illustrated in FIG. 4. The preferred embodiment has optional added elements which may be employed individually or in various combinations as will be apparent to those having skill in the art. These elements can be added to the basic tile construction which is discussed above in respect of FIGS. 1-3.

In FIG. 4, the tiles are comprised of a substrate 22 overlayed by a decorative layer 23. The decorative layer 23 is overlayed by a performance top coating 24 which in turn is overlayed by a protective layer 25. The tiles are optionally beveled at edge 26. Edge 26 can have other shapes, such as convex or concave rounding and the like, as design options that will be apparent to those having skill in the art. The decorative layer can be any kind of decoration commonly used in tiles of the type described herein including printed layers comprised of inks and/or plastics, wood or simulated wood veneers, metals and the like.

Turning to the underside of the tile, a back layer 27 is illustrated.

The various layers and the substrate can be adhered to one another by laminating or other manufacturing techniques known to those having skill in the art.

Upper reinforcements and lower enforcements are designated by reference numerals 28 and 29 and these are recommended for use in thinner tiles. The reinforcements can be made, for example, from a mesh or textile material which is impregnated into the substrate 22 in a conventional calendering operation. The kinds of reinforcement materials used at 28 and 29 are known in the art and can be the same or different. Suitable materials include polyester fleece, a scrim such as Porche-Chavanoz D12155093 2×2 yarn/cm or a glass fleece such as Ownens Corning AH 24. When a glass fleece is used at 28, it needs to be impregnated with plastisol before laminating a decorative layer thereon.

Figure 5:
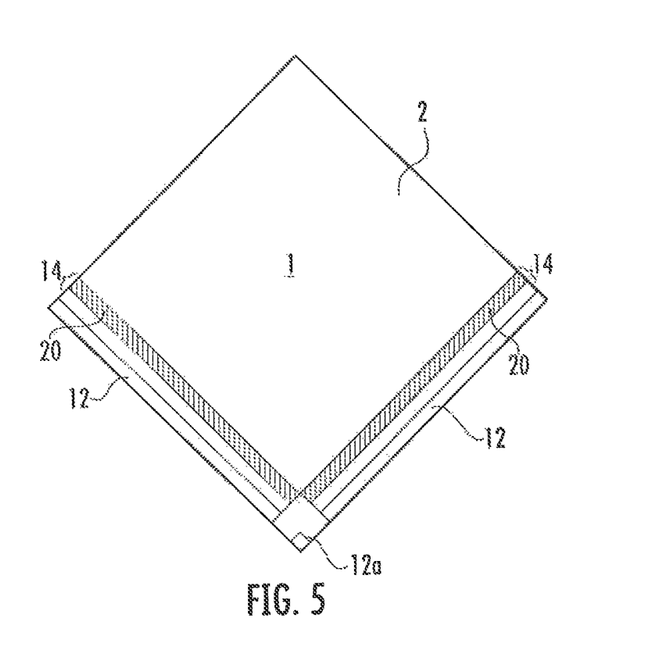
FIG. 5 is a view of the top of a tile of the invention.

FIG. 5 is a top view of tile 1 of the invention. The figure illustrates, among other elements, upper the surface 2, first raised portions 12 and optional elements 20. First corner raised portion 12a is optional and it can be employed to enhance the structural integrity of the tiles when they are assembled.

Figure 6:
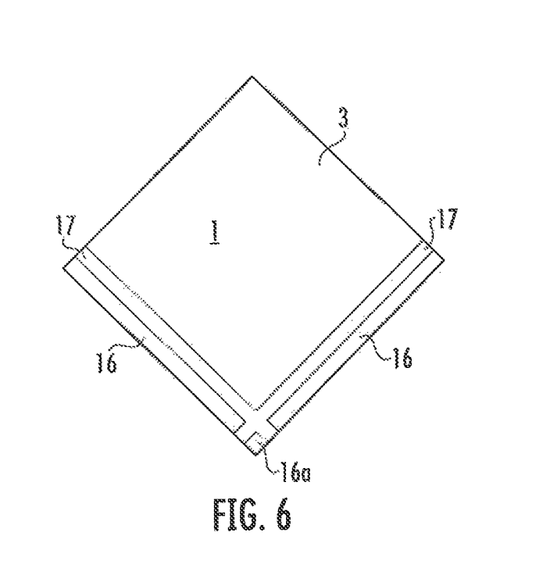
FIG. 6 is a view of the bottom of a tile of the invention.

A bottom view of tile 1 is illustrated in FIG. 6. The figure illustrates, among other elements, lower tile surface 3, second raised portions 16 and channels 17. Second corner raised portion 16a is optional and serves the same purpose as first corner raised portion 12a.

Figure 7:
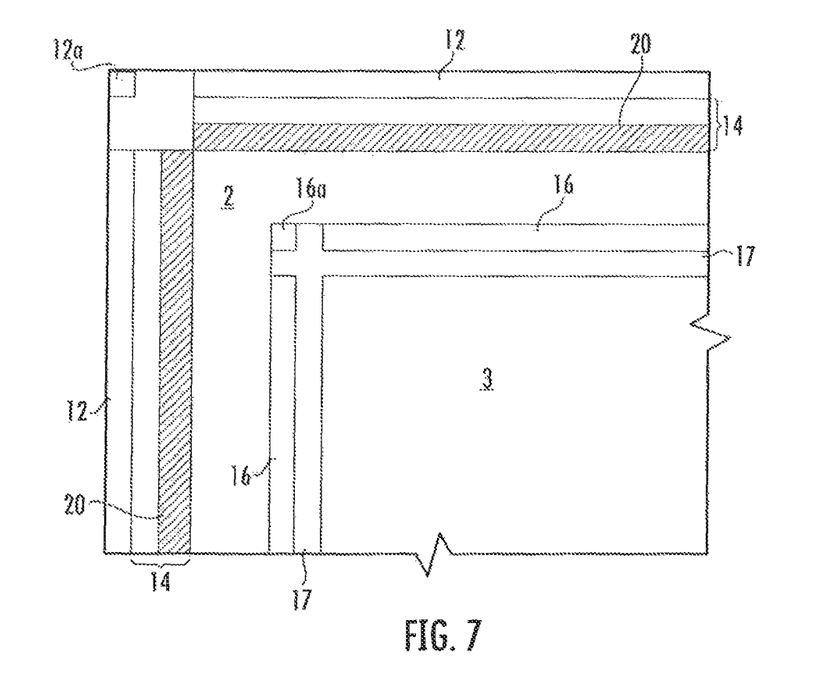
FIG. 7 illustrates the top of a portion of one tile overlayed by the bottom of a portion of another tile.

FIG. 7 illustrates the underside of a tile portion partially overlaying the top side of another tile portion. The figure provides a side-by-side comparison of the upper and lower junction strips.

Figure 8:
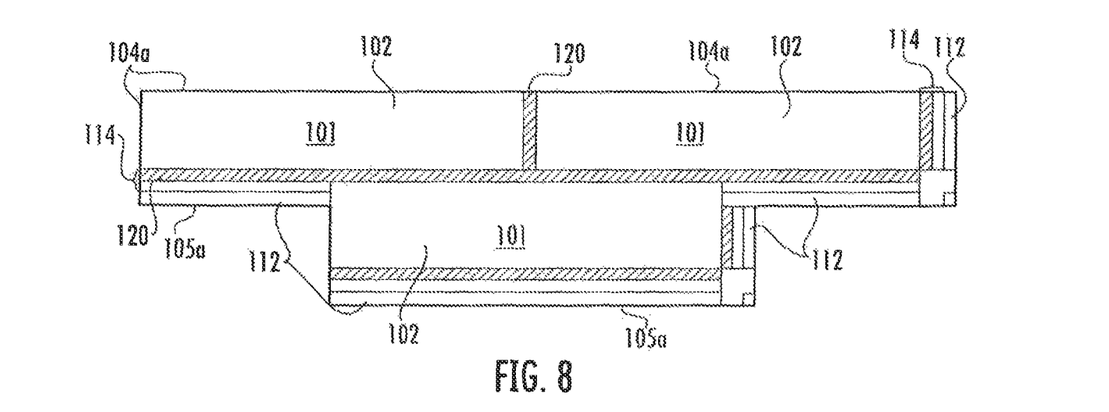
FIG. 8 is a top view of three rectangular tiles which have been assembled according to the invention.

In FIG. 8, three assembled rectangular tiles 101 having upper tile surfaces 102 are illustrated in a top view. First raised portions 112 and optional decorative portions or grout base 120 are illustrated. The upper junction strip outer edges 104a designate the edges of the upper junction strips which face downwardly from the tops of the tiles in the same manner and having the same construction as the upper junction strips of the tiles discussed in respect of FIGS. 1-3 above. Outer edges of the lower junction strips are designated as 105a.

Figure 9:
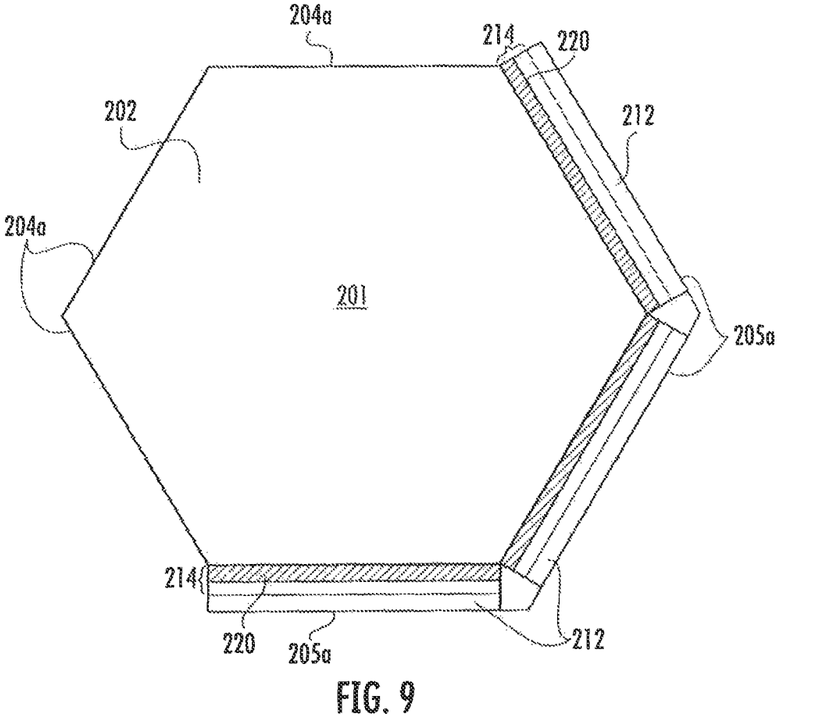
FIG. 9 is a top view of a hexagonal tile of the invention.

FIG. 9 is a top view of hexagonal tile 201 having an upper tile surface 202. First raised portions 212 and optional decorative or grout base portions 220 are illustrated. The upper junction strip outer edges 204a designate the edges of the upper junction strips which face downwardly from the top of the tile in the same manner and having the same construction as the upper junction strips of the tiles discussed in FIGS. 1-3 above. One of the principles of the invention is that the tiles need to have an even number of sides. One half of the side edges of the upper tile surface have adjacent lower junction strips extending therefrom and the other half of the side edges have adjacent upper junction strips extending therefrom. The upper junction strips and lower junction strips extend from opposing side edges. Thus, in hexagonal tile 201, three of the upper junction strips extend from adjacent side edges opposite the three side edges from which the lower junction strips extend. The outer edges of the lower junction strips are designated as 205a.

Figure 10:
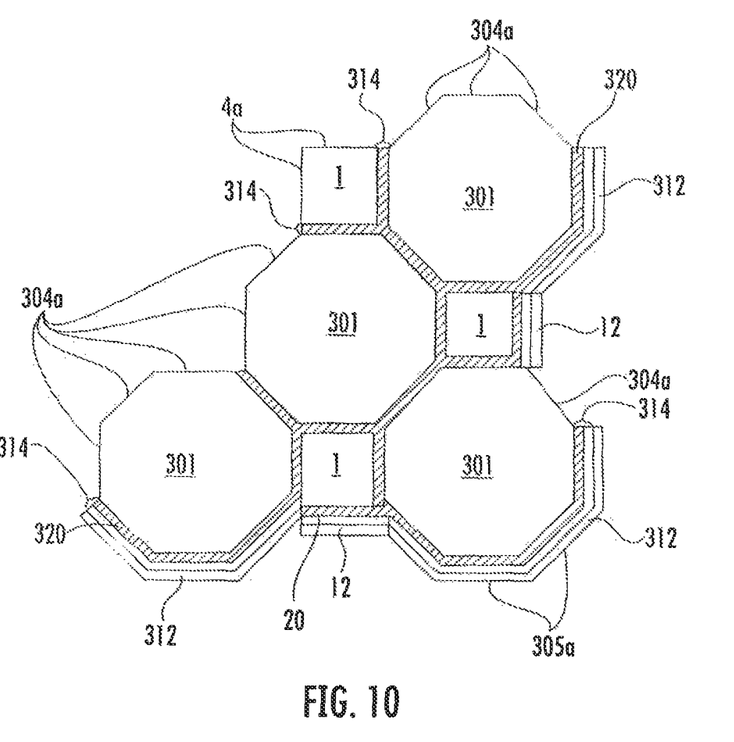
FIG. 10 is a top view of a combination of four octagonal tiles and three square tiles which have been assembled according to the invention.

FIG. 10 illustrates a combination of assembled octagonal and square tiles in a top view. Octagonal tiles 301 are assembled with square tiles 1. In the octagonal tiles there are four adjacent lower junction strips having outer edges designated as 305a and there are four adjacent upper junction strips on the undersides of the tiles having outer edges designated as

304*a*. Of course, the lower junction strips have the same construction as those discussed above. The first raised portions are designated as 312 and optional decorative or grout base portions are designated as elements 320.

The tiles of the present invention are made using synthetic materials but they can be decorated to imitate ceramics, concrete, glass, bricks, adobe, textiles or metals. They can also be decorated to imitate natural materials such as marble, granite and wood. Other design options will be apparent to those having skill in the art. The preferred tiles of the invention are resilient tiles which have a certain degree of flexibility or resiliency. Materials used to make a resilient floor tile may include organic materials, such as polymeric materials, including, for example, vinyl or mixtures of organic and inorganic materials. Thus, a substrate of the tiles of the invention may be made of any material useful in making a resilient tile. For example, the substrate may comprise a mixture of limestone and a polymeric resin and may also include plasticizers and pigments. More specifically, the polymeric resin may be a copolymer or a homopolymer. Specific examples of base compositions include a final composition that includes limestone, acetate, polyvinylchloride resin, plasticizer and, optionally, pigments, where the organic materials function as a binder for the limestone. Alternatively, the substrate may be a vinyl composition that includes limestone, polyvinylchloride homopolymer, plasticizer, and, optionally, pigments, where the organic materials also function as a binder for the limestone.

The substrate contributes significantly to the overall flexibility of the resilient tile. While any material may be used as the substrate, it is preferred that the substrate composition and, therefore, the overall resilient tile, have some rigidity and not be completely flexible, such as a rubber the or solid vinyl tile. Since the binder content of the substrate affects the level of rigidity of the overall resilient tile, it is preferred that the total organic content or binder content of the substrate be from about 20% to about 40% by weight. Three typical formulations for the substrate of the invention are (1) 23% resin, 7% plasticizer, 67% calcium carbonate and 3% pigments and stabilizers, (2) 30% resin, 8% plasticizer, 59% calcium carbonate and 3% pigments and stabilizers, and (3) 38% resin, 12% plasticizer, 47% calcium carbonate and 3% pigments and stabilizers. At lower resin contents, such as 23%, the tiles may chip somewhat when routing is used as the method of forming the junction strips of the invention. This can be avoided if the tiles are formed using molding rather than grouting.

Various tile thicknesses can be used and thicknesses from about ⅛ inch to ¼ inch are not uncommon. In thinner tiles, however, mesh or textile reinforcements need to be impregnated into the upper and lower surfaces of the substrate in order to prevent the junction strips from breaking off.

The shapes and sizes of the tiles can be varied depending upon design needs as will be apparent to those having skill in the art.

In a typical manufacturing process, raw materials for the substrate are fed into a continuous mixer and the output of material from the mixer is conveyed to an extruder. It is extruded through a roller head die into a calendar. The calendar produces a web at the desired thickness. Sheet is conveyed to an embossing station where a texture is applied and a vinyl film with a pattern and a clear wear layer is laminated to the substrate. The web is then cooled, coated with a urethane coating, cut into oversize blanks, annealed, cooled, and die cut. The die cut tiles are then palletized and taken to the finishing department. The tiles are then loaded into a beveler (router) and conveyed through the beveler into the first junction routing station that routes one edge of the top side to make a lower junction strip and trim the junction strip outer edge. Immediately following the routed edge and the opposite edge are crimped (i.e., the edges are rolled to provide a radius on the edges of the decorative surfaces next to the grout line) and/or an imitation grout line is embossed. From this point the tile is turned 90 degrees and the next lower junction strip is routed followed with the crimping and/or embossing process of the remaining two edges. The next step is to route the adjacent junction strips on the bottom of the tiles to make the upper junction strips and trim the junction strip outer edges. Then the tiles are conveyed to the adhesive application station where adhesive and release paper are applied to the junction strips if needed (some tiles will require hot melt adhesive applied at this time, others will have adhesive applied in the field and some will not require any adhesive), The tiles then proceed to the flip/stack/packaging equipment where they are prepared for warehousing and/or shipping.

EXAMPLE

Square tiles imitating the appearance of ceramic and having finished dimensions of 16 inches by 16 inches and a thickness of 0.175-0.180 inches were made in two runs, one with a binder content of 30% and the other with a binder content of 38%. The 30% binder tiles had a Shore D hardness of 64 and a specific gravity of 1.82-1.86. The 38% binder tile had a Shore D hardness of 63 and a specific gravity of 1.70-1.75. Scrap was used as a portion of the raw materials in making up the substrate formulation. The manufacturing process set forth above was followed using calendar roll temperatures of 250° F. to 260° F., a urethane entry temperature from 130° F. to 152° F. (using six UV lamps) and a film heat of 110° F. to 115° F. The temperature entering the embosser was at 325° F.-330° F. and the cooling pan entering temperature was set at 294° F. A backing having the same composition as the substrate was also laminated onto the underside of the substrate. The edges of the decorative layer were beveled by crimping and a router was used to form the junction strips. No chipping was observed as a result of crimping and routing the tiles of either binder content.

Various materials may be used to prepare a decorative pattern or design for application to the tile. The decorative layer may be a printed ink that provides a decorative pattern or design or the layer may be a plurality of particles or chips of various solid materials, such as wood, textiles, metals or plastics that are disposed on top of or embedded in the top of the substrate. These materials may also be used in combination with a printed ink.

Transparent performance topcoatings may also be applied over the decorative layer. A performance topcoating may be made from a polymeric film, such as polyvinylchloride.

A protective layer also may be applied on top of the performance topcoating. The protective layer may comprise a polymeric film, such as a urethane film that is cured using ultraviolet radiation. The protective layer is designed to protect the performance topcoating and the decorative layer. The protective layer also may comprise additional components, such as particles including, for example, aluminum oxide or nylon and it may have visible texture. The protective layer also may be applied directly over the decorative layer if a performance topcoat is not used.

What is claimed is:

1. A surface covering tile consisting essentially of an upper tile surface and an opposing lower tile surface, the upper tile surface lying in a first plane and the lower tile surface lying in a second plane in parallel with the first plane, the distance from the first plane to the second plane defining a thickness of the tile, the upper tile surface having an even number of sides and the lower tile surface having the same number of sides as the upper tile surface, the sides of the lower tile surface being offset and in parallel with the sides of the upper tile surface, each side of the upper tile surface and the lower tile surface having a side edge, one half of the side edges of the upper tile surface being adjacent, upper tile surface side edges having a lower junction strip extending therefrom and one half of the side edges of the lower tile surface being adjacent, lower tile surface side edges having an upper junction strip extending therefrom, each lower junction strip extending in a direction opposite an upper junction strip, each lower junction strip having an upper face and an opposing lower junction strip surface, the lower junction strip surface comprising a portion of the lower tile surface and each upper junction strip having a lower face and an opposing upper junction strip surface, the upper junction strip surface comprising a portion of the upper tile surface;

each lower junction strip having a lower junction strip outer edge and the upper face comprises a first raised portion and a first channel, each first raised portion having a first inner edge, and each first channel having a first width defined by the upper tile surface side edge and the first inner edge, the first inner edge and the lower junction strip outer edge being in parallel with the upper side edge and defining a second width of each first raised portion, the lower junction strip outer edge defining a side edge of the lower tile surface;

each upper junction strip having an upper junction strip outer edge and the lower face comprises a second raised portion and a second channel, each second raised portion having a second inner edge, and each second channel having a third width defined by the lower tile surface side edge and the second inner edge, the second inner edge and the upper junction strip outer edge being in parallel with the lower side edge and defining a fourth width of each second raised portion, the upper junction strip outer edge defining a side edge of the upper tile surface;

the first raised portions of the lower junction strips having a thickness less than the thickness of the and being sized to fit within and interlock with the second channels of the upper junction strips; and the second raised portions of the upper junction strips having a thickness less than the thickness of the tile, the fourth width of each second raised portion of the upper junction strips being less than the first width of each first channel of the lower junction strips wherein a space extends between a side edge of the upper surface having a lower junction strip extending therefrom and an upper junction strip outer edge when the surface covering tile is attached to another surface covering the having the same construction and a portion of the upper surface of the first channel is visible in the space from eyes looking down upon the upper surfaces.

2. The surface covering tile of claim 1 having a decorative layer overlaying the upper tile surface.

3. The surface covering of claim 2 having a performance topcoating over the decorative layer.

4. The surface covering of claim 3 having a protective layer over the performance topcoating.

5. The surface covering of claim 2 having a protective layer over the decorative layer.

6. The surface covering of claim 1, 2, 3, 4 or 5 having a backing layer overlaying the underside of the lower tile surface.

7. The surface covering of claim 6 having an adhesive layer on the upper and/or lower junction strips.

* * * * *